United States Patent [19]

Hayashi

[11] Patent Number: 4,671,760
[45] Date of Patent: Jun. 9, 1987

[54] APPARATUS FOR STRETCHING A PLASTIC RAW MATERIAL

[76] Inventor: Torahiko Hayashi, 3-4, Nozawa-machi, Utsunomiya-shi, Tochigi-ken, Japan

[21] Appl. No.: 762,597

[22] Filed: Aug. 5, 1985

[30] Foreign Application Priority Data

Aug. 21, 1984 [JP] Japan .............................. 59-172416

[51] Int. Cl.$^4$ ................................................ A21C 3/02
[52] U.S. Cl. .................................... 425/373; 425/371; 425/372; 426/502
[58] Field of Search ............... 425/373, 372, 337, 335, 425/371, 145, 133.1; 318/727; 426/502, 517; 99/460–464

[56] References Cited

U.S. PATENT DOCUMENTS

| | | | |
|---|---|---|---|
| 795,581 | 7/1905 | Corby | 425/372 |
| 1,134,970 | 4/1915 | Lawrence | 425/337 |
| 2,950,221 | 8/1960 | Bauer et al. | 425/373 X |
| 3,038,418 | 6/1962 | Gugler | 425/372 |
| 3,191,553 | 6/1965 | Rich et al. | 425/373 |
| 3,973,895 | 8/1976 | Hayashi | 425/372 |
| 4,266,920 | 5/1981 | Hayashi et al. | 426/502 X |
| 4,421,776 | 12/1983 | Brinkers et al. | 425/373 X |

OTHER PUBLICATIONS

Poloujadoff, M.; "Linear Induction Machines"; *IEEE Spectrum*, vol. 8, No. 2, Feb, 1971; pp. 72–80.

*Primary Examiner*—Richard L. Chiesa
*Attorney, Agent, or Firm*—Guy W. Shoup

[57] ABSTRACT

An apparatus for stretching a plastic raw material having viscoelasticity, such as bread dough or confectionery dough. A linear motor or built-in motor is provided relative to rollers which pass around an endless roller path. A drive power of the motors for the advancement of the rollers is effectively transmitted by the friction of the rollers with the raw material or rails so as to simply rotate the rollers around their axes and along an endless roller path, thereby performing effective stretching of the plastic raw material.

4 Claims, 6 Drawing Figures

APPARATUS FOR STRETCHING A PLASTIC RAW MATERIAL

BACKGROUND OF THE INVENTION

1. Field of the Invention

This invention relates to an apparatus for stretching a plastic raw material, particularly to an apparatus for stretching plastic dough having viscoelasticity, such as bread dough or confectionery dough. More particularly, it relates to such apparatus whereby stretching can be performed without a complex mechanism.

2. Description of the Prior Art

As one form of prior art apparatus to stretch dough such as bread dough or confectionery dough, a dough stretching apparatus as disclosed in U.S. Pat. No. 3,973,895 is frequently employed, in which apparatus conveyors are arranged in series and driven at progressively higher speeds, and a plurality of rollers, rotatable about their axes and along an endless roller path, are disposed above the conveyors.

However, in such a prior art apparatus, the movement of the rollers is achieved by a complex drive mechanism.

For example, a pair of chains is mounted to shafts of rollers, at both ends of rollers, to connect the rollers along an endless roller path. As the rollers are freely rotatably mounted to respective shafts, the rollers can rotate about their axes and progress along the endless roller path caused by the movement of the chains. Accordingly, the prior art apparatus requires a transmission mechanism to rotate rollers and a driving device to cause the chains to progress, thereby requiring a large space for these devices.

SUMMARY OF THE INVENTION

It is an object of the present invention to provide an apparatus for stretching a plastic raw material by a simple mechanism. It is another object of the present invention to provide an apparatus for stretching a plastic raw material where the movement of rollers is readily controlled.

In one aspect of the present invention, an apparatus for stretching a plastic raw material is provided, which comprises a plurality of serially arranged conveyors and a plurality of rollers, in an endless roller path, positioned above the plurality of conveyors, characterized in that shafts of the rollers are provided with movers of a linear motor, and that a ring-form stator of the linear motor is positioned, spaced apart by a predetermined distance from the movers, along the endless roller path.

In another aspect of the present invention, an apparatus for stretching a plastic raw material is provided, which comprises a plurality of serially arranged conveyors and a plurality of rollers, in an endless roller path, positioned above the plurality of conveyors, characterized in that a shaft of at least one of the rollers is provided with a mover of a linear motor; that a ring-form stator of the linear motor is positioned, spaced apart by a predetermined distance from the mover, along the endless roller path, and that connecting means are provided to link the shafts of the rollers with each other.

According to the present invention, an apparatus for stretching a plastic raw material is furthermore provided, which comprises a plurality of serially arranged conveyors and a plurality of rollers, in an endless roller path, positioned above the plurality of conveyors, characterized in that at least one of the rollers is provided with a built-in motor to have the rollers rotate about their axes and progress along the endless roller path, and that connecting means are provided to link the shafts of the rollers with each other.

The present invention comprises serially arranged conveyors and a plurality of rollers adapted to rotate about their axes and progress along an endless roller path by means of a linear motor or a motor mounted in the roller.

Conveyors are arranged in series. An upstream conveyor receives a plastic raw material and conveys it to a downstream conveyor. Above these conveyors are positioned a plurality of rollers arranged in an endless roller path, which may be an oval path having a straight portion at its bottom spaced apart from the conveyors by a predetermined distance. The distance between an upstream conveyor and the roller path may be greater than the distance between a downstream conveyor and the roller path. The rollers are freely rotatable about their shafts and are arranged to progress along the roller path at a speed higher than any of the conveyors, which are run in such a speed relationship that an upstream conveyor is slower than a downstream conveyor. The plastic raw material fed on the conveyors is stretched by the co-action between the rollers and the conveyors.

The driving force for the rollers is obtained by a linear motor or a built-in motor mounted in the hollow portion within one or more rollers. When the linear motor is used, each roller or at least one roller is provided with a mover, forming a portion of the linear motor, fixed to a shaft about which the roller is made to rotate. The other portion of the linear motor, i.e., the stator, is disposed along the endless roller path. The mover is also called a reaction plate when the linear motor is a linear induction motor. Further, various other types of linear motors can be used in the present invention by using a primary member and a secondary member of the linear motor either as a stator or a rotor, respectively. When a built-in motor is utilized, rollers equipped with the built-in motors rotate about their axes, while the rotation of shafts about their axes is precluded. In accordance with the present invention, complex mechanisms which have hitherto been employed are not required, and a simple and reliable composition of the apparatus can be achieved, which enables the speed control required for stretching to be carried out without difficulty.

To secure the progress of the rollers on the endless roller path, any suitable means may be employed. Especially in case only one roller is equipped with a mover, it becomes necessary to connect the rollers by means of link arms.

DESCRIPTION OF THE PREFERRED EMBODIMENTS

Figure 1:
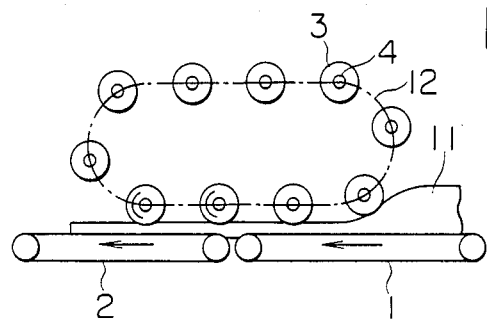
FIG. 1 is a side elevation view showing a stretching apparatus composed of two conveyors and a plurality of rollers of the present invention.
Figure 2:
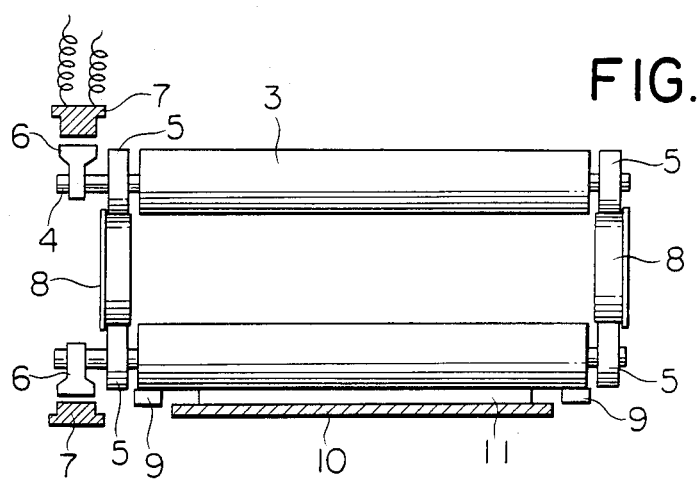
FIG. 2 is a cross-sectional view of the rollers provided with a linear induction motor of a first embodiment of the present invention.
Figure 3:
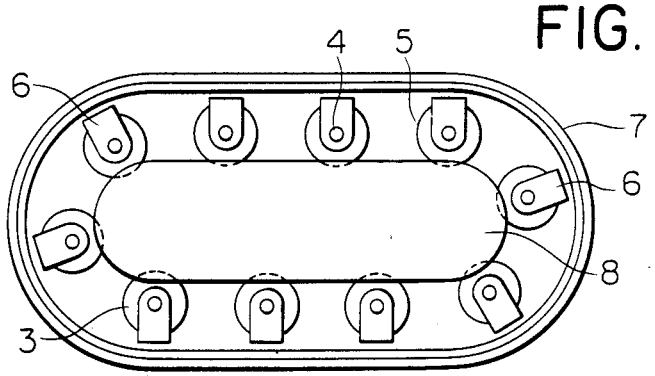
FIG. 3 is a side elevation view showing the rollers, each roller having a mover of a linear induction motor, of the first embodiment of the present invention.

The structure of a first embodiment of the present invention will be described with reference to FIGS. 1 through 3. FIG. 1 shows a stretching apparatus comprising two conveyors 1 and 2 and a plurality of rollers 3. A plastic raw material, for instance, dough 11 is fed on the conveyors in the direction of the arrows. The conveyors may be belt-conveyors and arranged in series. The downstream conveyor is run at a faster speed than the upstream conveyor. The rollers 3 are arranged to run along an oval path in the clockwise direction in FIG. 1 at a substantially higher speed than either of the conveyors. When the rollers are at the bottom stretch of the oval path, the rollers are spaced apart from the conveyors so as to allow the passage of the dough. When the dough is fed into the space between the rollers and the conveyors, the rollers are made to rotate about their shafts in the counter-clockwise direction in FIG. 1, while they advance at a speed substantially greater than the progress of the dough, thereby stretching the dough.

The rollers 3 are freely rotatably mounted to shafts 4. Bearings 5 in the form of a wheel of a diameter larger than the shaft 4 are mounted to shafts 4 adjacent both ends of rollers 3. A pair of oval-shaped guides 8 are disposed inside the endless roller path 12 to function as a travel guide for the movement of the bearings 5. The guides 8 are in turn mounted to the frame of the apparatus.

A reaction plate 6 of a linear induction motor is fixed to the ends of each of the shafts 4, and a stator 7 is disposed, along a plane parallel to the endless roller path, leaving a predetermined space from the reaction plates 6. The stator 7 is formed as the primary member of the linear induction motor, and the reaction plates 6 and the stator 7 can act in combination as a linear induction motor. The bearing 5 on the other end of each roller 3 is inserted into a space between a guide 8 and the frame (not shown) so that the rollers are retained in position. Rails 9 are disposed underneath and at both ends of the rollers on the bottom stretch of the endless roller path 12 and are in contact with the surfaces of the rollers. Since each roller is provided with a reaction plate 6, each roller can move independently of and in unison with the other rollers around the guides 8 when an electric current is supplied to the stator 7, and, when the rollers come into contact with the rails 9, they also rotate around their axes by the friction with the rails 9.

In operation, dough 11 is fed into the apparatus between a conveyor belt 10 and the rollers 3 on the bottom stretch of the endless roller path 12. The conveyors 1, 2 are run such that the downstream conveyor 2 is faster than the upstream conveyor 1. The rollers 3 progress at a speed higher than the conveyors 1, 2 while rotating about their axes. The rotation and progress of the rollers are caused by the linear inductive action between the reaction plates 6 in the rollers and the ring-form stator 7.

Figure 4:
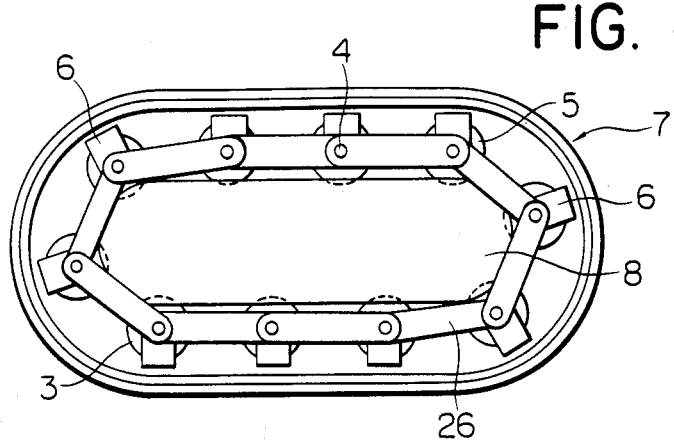
FIG. 4 is a side elevation view showing the rollers provided with arms 26 of a second embodiment of the present invention.

A second embodiment of the present invention is shown in FIG. 4, in which each pair of adjacent rollers 20 are connected with a link arm 26. The arm 26 has holes at both ends thereof to be rotatably mounted onto the shaft 4 of each of the pair of rollers 20. The arm 26 which connects one roller of the pair is further connected by a similar arm to a third roller next to the pair in a similar manner, except that the arm is mounted to the shafts 4 at a position offset from the first arm 26. In this manner each roller is connected to the adjacent rollers throughout the endless roller path 12. In this embodiment, the rollers are made to move along the guides 8 if only one roller is provided with a reaction plate 6.

Figure 5:
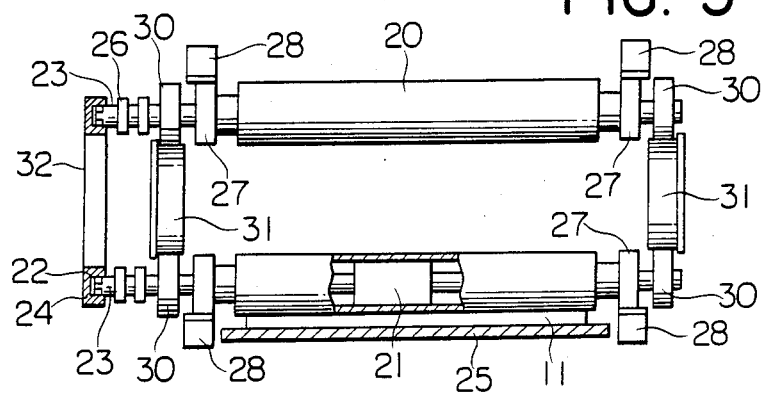
FIG. 5 is a cross-sectional view of rollers one of which is provided with a built-in motor of a third embodiment of the present invention.
Figure 6:
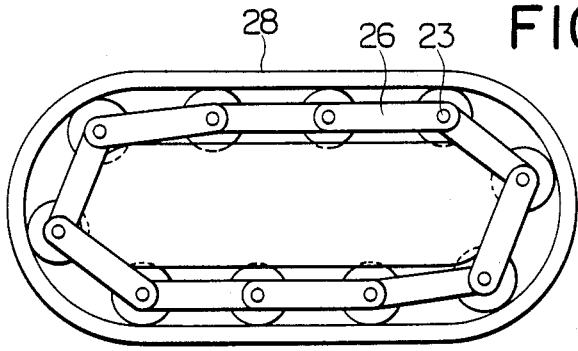
FIG. 6 is a side elevation view showing rollers provided with arms 26 of the third embodiment of the present invention. A distributor 32 is taken off in the drawing.

The third embodiment of the present invention will next be described, which is shown in FIG. 5 and 6. This embodiment is similar, in the general composition, to those described in the second embodiment. As in the aforementioned embodiments, dough 11 is fed into the apparatus between a conveyor belt 25 and the rollers 20 on the bottom stretch of the endless roller path 12 and is stretched by the co-action of the conveyors and the rollers in a similar manner as in the previous embodiments. What differs here is the drive mechanism. At least one motor 21 is fixedly mounted within one of the rollers and an electric current is supplied from a distributor 32 through electrodes 22 and 24. The roller 20 is rotatably mounted on a shaft 23 and is made to rotate by the driving force of the motor 21. The motor 21 is provided with a shaft (not shown), which extends in the center of the motor constituting a stator, and rotatably engages the rest of the motor 21 constituting a rotor. The stator of the motor 21 is fixed to the shaft 23, and the rotor of the motor 21 is fixed to the roller 20, whereby the rotation of the roller 20 about the shaft 23 can be possible when an electric current is supplied to the motor 21.

As in the second embodiment, an arm 26 is mounted on each shaft 23 and connects any pair of adjacent shafts. Thus, all the rollers 20 are spaced apart from each other by the distance of an arm. Each arm 26 is connected to each shaft 23 in such a manner as to preclude a free rotation of the shaft 23 about its axis, but care must be taken so that the arm 26 can slightly rotate to permit its progress about the rounded ends of the guides 31. In this arrangement, if a roller progresses along the endless roller path, all the other rollers are made to progress simultaneously. In this arrangement the rollers can be rotated by the motor 21 around the shafts 23. A pair of wheel-form bearings 30 are fixedly mounted on both ends of the shaft 23, one on each end, and come into contact with an oval-form guide 31 provided near each end of the shaft 23. The bearings 30 serve to cause the shafts 23 to move around the guides 31.

A pair of friction wheels 27 may be fixedly mounted on the shaft 23 on both sides of the roller 20. A pair of rails 28 are mounted on the frame facing the friction wheels 27 in a frictional relationship so that this arrangement helps cause the rotation of the rollers 20 about their axes to change, by the frictional engagement between the friction wheels 27 and the rails 28, into the movement of the rollers around the guides 31. In this sense it is advantageous to have the rails and the friction wheels, but even without them the apparatus of this embodiment still functions, because the frictional contact of the rollers 20 with the dough 11 and the rotation of the rollers 20 makes the rollers to progress.

In the aforementioned embodiments, the speeds of the linear motor and the built-in motor are easily controlled in the usual manner, thereby achieving desired stretching effects. Although the aforesaid embodiments of the present invention use an oval path as a passage for the rollers, any other endless roller path, for instance, a circular roller path, may be used.

Furthermore, although in the aforementioned embodiments the plastic raw material to be stretched is plastic dough such as bread dough or confectionery dough, the apparatus of the present invention is in no way limited to the stretching of such a food material, but may also be applied to stretching any material in other industries.

The plastic raw material stretching apparatus of the above structure obviates the need for a complex device employed in the prior art dough stretching apparatus, so that the construction of the apparatus can be simplified. Also, since the apparatus of present invention is so constructed that a plurality of rollers are provided with linear motors or built-in motors, which can be easily and securely operated, stretching of the plastic raw material can be very easily controlled.

I claim:

1. An apparatus for stretching a plastic raw material, comprising a plurality of serially arranged conveyors and a plurality of rollers, in an endless roller path, positioned above the plurality of conveyors and rotatable on respective roller shafts, characterized by a linear motor comprising a ring-form stator and at least one mover movable along a ring path within said ring-form stator by inductive reaction with said stator, wherein: said at least one mover is connected with a shaft of at least one of the rollers; said ring-form stator of the linear motor is positioned, spaced apart by a predetermined distance from the at least one mover, for driving said at least one mover along said ring path; and connecting means are provided to link the shafts of the rollers with each other such that said at least one driven mover moves said rollers along the endless roller path.

2. An apparatus of claim 1, further comprising rails disposed in frictional contact with the plurality of rollers.

3. An apparatus for stretching a plastic raw material, comprising a plurality of serially arranged conveyors and a plurality of rollers, in an endless roller path, positioned above the plurality of conveyors and rotatable on respective roller shafts, characterized by a linear motor comprising a ring-form stator and a plurality of movers movable along a ring path within said ring-form stator by inductive reaction with said stator, said movers each being connected with a shaft of a respective one of said rollers, and said ring-form stator of the linear motor being positioned, spaced apart by a predetermined distance from the movers, along said ring path for driving said movers so as to move said rollers along the endless roller path.

4. An apparatus of claim 1, further comprising rails disposed in frictional contact with the plurality of rollers.

* * * * *